United States Patent
Wang

(10) Patent No.: US 10,258,873 B2
(45) Date of Patent: Apr. 16, 2019

(54) COMPUTER MOUSE WITH SWINGABLE PALM REST COVER

(71) Applicants: DEXIN ELECTRONIC LTD., Donggaun, Guangdong (CN); DEXIN CORPORATION, New Taipei (TW)

(72) Inventor: Ting-Sheng Wang, New Taipei (TW)

(73) Assignees: DEXIN ELECTRONIC LTD., Dongguan, Guangdong (CN); DEXIN CORPORATION, New Taipei (TW)

(*) Notice: Subject to any disclaimer, the term of this patent is extended or adjusted under 35 U.S.C. 154(b) by 153 days.

(21) Appl. No.: 15/432,480

(22) Filed: Feb. 14, 2017

(65) Prior Publication Data

US 2018/0229114 A1 Aug. 16, 2018

(51) Int. Cl.
*G06F 3/0354* (2013.01)
*A63F 13/218* (2014.01)
*G06F 3/039* (2013.01)
*A63F 13/24* (2014.01)

(52) U.S. Cl.
CPC ............ *A63F 13/218* (2014.09); *A63F 13/24* (2014.09); *G06F 3/039* (2013.01); *G06F 3/03543* (2013.01); *A63F 2300/1043* (2013.01); *A63F 2300/1056* (2013.01)

(58) Field of Classification Search
None
See application file for complete search history.

(56) References Cited

U.S. PATENT DOCUMENTS

| | | | | |
|---|---|---|---|---|
| 5,841,426 A * | 11/1998 | Dodson | ................ | G06F 3/0334 345/163 |
| 5,949,401 A * | 9/1999 | Kazarian | ............... | G06F 3/0213 345/156 |
| 6,064,370 A * | 5/2000 | Wang | ..................... | B03B 5/623 345/156 |
| 6,191,774 B1 * | 2/2001 | Schena | .................. | G01B 5/008 345/163 |
| 6,369,797 B1 * | 4/2002 | Maynard, Jr. | ....... | G06F 3/03543 345/163 |
| 6,580,420 B1 * | 6/2003 | Wang | .................. | G06F 3/03541 345/157 |
| 7,109,972 B2 * | 9/2006 | Fu | ........................... | G06F 3/033 345/156 |
| 7,227,533 B2 * | 6/2007 | Hong | .................. | G06F 3/03543 345/163 |

(Continued)

*Primary Examiner* — Xanthia C Cunningham
(74) *Attorney, Agent, or Firm* — Li & Cai Intellectual Property (USA) Office

(57) ABSTRACT

A computer mouse with a swingable palm rest cover includes a main body, a switch module, buttons, a magnetic sensor and a magnetic element. The main body has an upper housing and a lower housing. The switch module is disposed in the main body and connected to a circuit board. The buttons are movably disposed on the main body. The palm rest cover is slidably disposed on the upper housing of the main body. The magnetic sensor, which is connected to the circuit board, is disposed on the upper housing or the lower housing. The magnetic element is disposed on the lower housing or the upper housing. When the palm rest cover is swung to left or to right, its displacement can be sensed by the magnetic sensor and the magnetic element, so as to produce a pressure sensing signal and output an analog signal.

4 Claims, 5 Drawing Sheets

(56) References Cited

U.S. PATENT DOCUMENTS

| | | | | |
|---|---|---|---|---|
| 8,077,147 | B2 * | 12/2011 | Krah | G06F 3/016 |
| | | | | 345/163 |
| 8,120,582 | B2 * | 2/2012 | Mao | G06F 3/03543 |
| | | | | 345/163 |
| 8,314,772 | B1 * | 11/2012 | Coe | G06F 3/03543 |
| | | | | 345/163 |
| 8,890,814 | B2 * | 11/2014 | Worthington | G05G 9/047 |
| | | | | 345/158 |
| 9,092,073 | B1 * | 7/2015 | Wang | G06F 3/03543 |
| 9,092,074 | B2 * | 7/2015 | Yin | G06F 3/03543 |
| 9,455,101 | B2 * | 9/2016 | Wilson | G06F 3/0219 |
| 9,569,014 | B2 * | 2/2017 | Drougge | G06F 3/03543 |
| 2007/0125913 | A1 * | 6/2007 | Miller | G06F 3/03543 |
| | | | | 248/118 |
| 2009/0225030 | A1 * | 9/2009 | Vaananen | G06F 3/0354 |
| | | | | 345/163 |
| 2010/0274932 | A1 * | 10/2010 | Kose | G06F 3/03543 |
| | | | | 710/19 |
| 2010/0295787 | A1 * | 11/2010 | Tang | G06F 3/03543 |
| | | | | 345/166 |
| 2011/0095983 | A1 * | 4/2011 | Lu | G06F 3/03543 |
| | | | | 345/166 |
| 2012/0176318 | A1 * | 7/2012 | Huang | G06F 3/03543 |
| | | | | 345/163 |
| 2017/0192536 | A1 * | 7/2017 | Wang | G06F 3/03543 |
| 2017/0300137 | A1 * | 10/2017 | Chen | G06F 3/03543 |

\* cited by examiner

COMPUTER MOUSE WITH SWINGABLE PALM REST COVER

BACKGROUND OF THE INVENTION

1. Field of the Invention

The present invention is related to a computer mouse. In particular, the present invention relates to a computer mouse with a swingable palm rest cover.

2. Description of Related Art

Keyboards and computer mice are the most commonly-used input devices for computer equipment. A conventional computer mouse usually has a left button, a right button and a scroll wheel between the left and right buttons. With the increasing interest in video games, game fans like to share experiences and exchange game tips through live stream, which has drawn public attention. To certain game players, they even devote themselves to being professional eSports players and choose it as a career. With the development and evolution of computer games, a computer mouse is often clicked more than hundreds of times when being used in a game.

However, conventional computer mice are typically disposed with only a simple digital signal output without having a function of sensing pressure, resulting in that they cannot be applied in video games in which the fine operating movement is needed, and cannot be used more conveniently and precisely.

A computer mouse having a swingable palm rest cover of the present disclosure is provided to overcome the above-mentioned drawbacks of conventional computer mice.

SUMMARY OF THE INVENTION

The objective of the present disclosure is to provide a computer mouse with swingable palm rest cover to enable the computer mouse to be used more precisely and conveniently in video games in which the fine operating movement is needed.

In order to achieve the above objectives, the present disclosure is to provide a computer mouse with swingable palm rest cover, which includes a main body, a switch module, a palm rest cover, a magnetic sensor and a magnetic element. The main body has a bottom housing and an upper housing. The upper housing is disposed on the bottom housing. The switch module is disposed in the main body and electrically connected to a circuit board. A button is movably disposed on the main body. An inner side of the button has a triggering portion. The triggering portion is disposed on the switch module. The palm rest cover is disposed on the upper housing of the main body in a left-and-right swingable manner. The magnetic sensor is disposed on one of the upper housing and the palm rest cover. The magnetic sensor is electrically connected to the circuit board. The magnetic element is disposed on the other of the upper housing and the palm rest cover. When the palm rest cover is swung to left or to right, the magnetic sensor and the magnetic element are capable of sensing a position change of the palm rest cover, so as to output an analog signal.

In order to achieve the above objectives, the present disclosure is further to provide a computer mouse with swingable palm rest cover, which includes a main body, a switch module, a button, a palm rest cover, a magnetic sensor and a magnetic element. The main body includes a bottom housing and an upper housing. The upper housing is disposed on the bottom housing. The switch module is disposed in the main body, and the switch module is electrically connected to a circuit board. The button is movably disposed on the main body. An inner side of the button has a triggering portion. The triggering portion is disposed on the switch module. The palm rest cover is disposed on the upper housing of the main body in a left-and-right swingable manner. A guiding mechanism is arranged between the palm rest cover and the upper housing to guide the palm rest cover to be swingable to left or to right on the upper housing of the main body. The magnetic sensor is a Hall effect sensor. The magnetic sensor is disposed on one of the upper housing of the main body and the palm rest cover. The magnetic sensor is electrically connected to the circuit board. The magnetic element is a magnet. The magnetic element is disposed on the other of the upper housing the main body of and the palm rest cover. When the palm rest cover is swung to left or to right, the magnetic sensor and the magnetic element are capable of sensing a position change of the palm rest cover, so as to output an analog signal.

In conclusion, the present disclosure has advantages as follows.

The present disclosure has the palm rest cover which is swingably disposed on the upper housing of the main body. The upper housing of the main body and the palm rest cover are interchangeably provided with the magnetic sensor and the magnetic element. A user can move his/her wrist to swing the palm rest cover to left or to right to produce a pressure sensing signal so as to output an analog signal which can control a pressing force. The computer mouse can be used to play various games in which the fine operating movement is needed. In the present disclosure, only the palm rest cover is swingable and the main body is stationarily placed on a desktop, so that the operating precision can be enhanced substantially.

For further understanding of the present disclosure, reference is made to the following detailed description illustrating the embodiments and examples of the present disclosure. The description is for illustrative purpose only and is not intended to limit the scope of the claim.

DETAILED DESCRIPTION OF THE PREFERRED EMBODIMENTS

Figure 1:
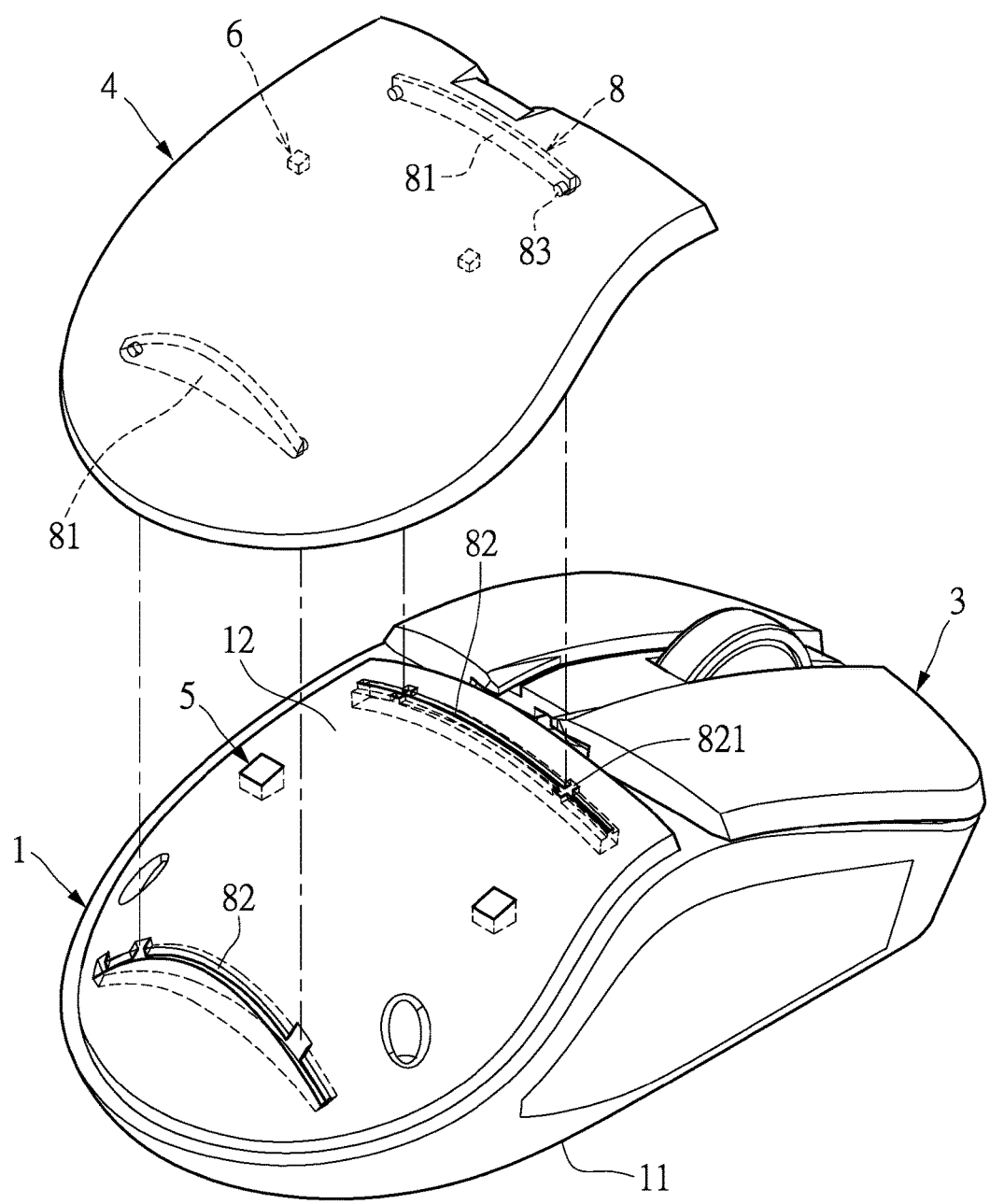
FIG. 1 is an exploded perspective view of a computer mouse of the present disclosure.
Figure 2:
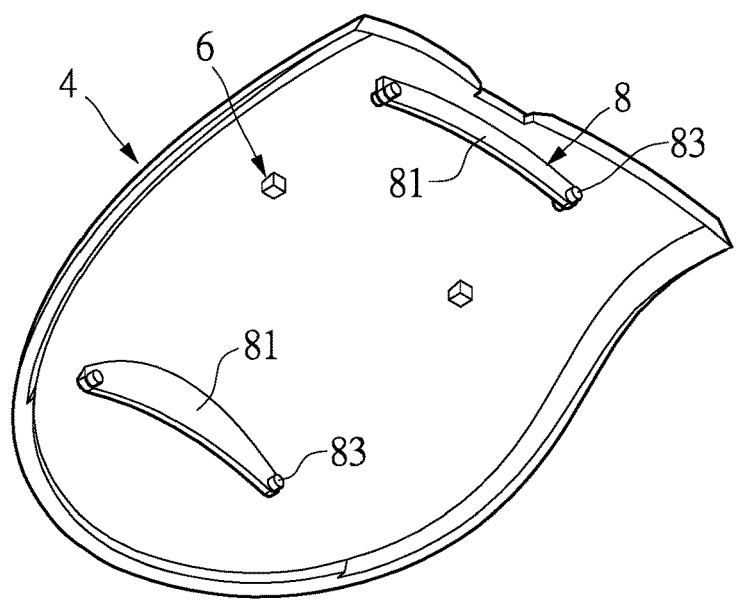
FIG. 2 is a perspective view of a palm rest cover of the present disclosure.
Figure 3:
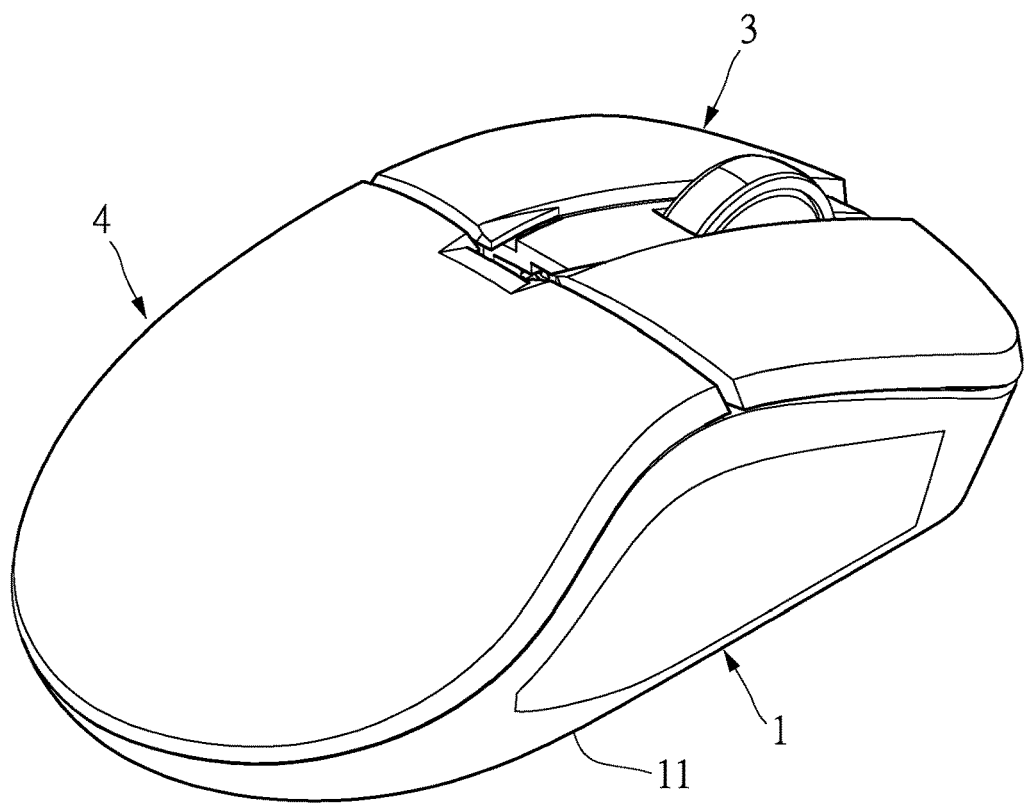
FIG. 3 is a perspective view of the computer mouse of the present disclosure.
Figure 4:
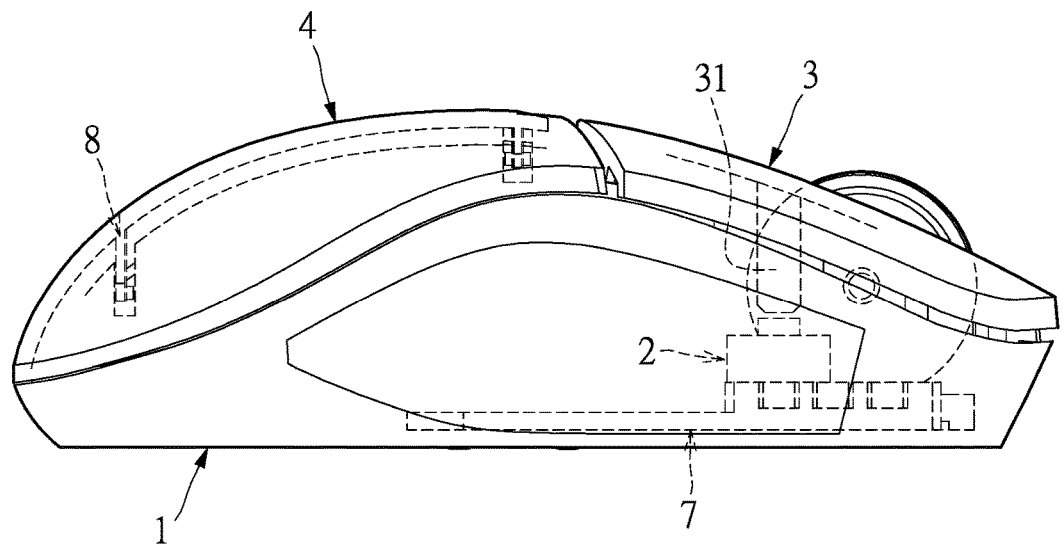
FIG. 4 is a side view of the computer mouse of the present disclosure.

The aforementioned illustrations and following detailed descriptions are exemplary for the purpose of further explaining the scope of the present disclosure. Other objectives and advantages related to the present disclosure will be illustrated in the subsequent descriptions and appended drawings.

First Embodiment

Please refer to FIG. 1 to FIG. 4. The present disclosure provides a computer mouse with swingable palm rest cover, which includes a main body 1, a pair of switch modules 2, a pair of buttons 3, a palm rest cover 4, a magnetic sensor 5, and a pair of magnetic elements 6.

The main body 1 is a hollow housing in which elements such as the switch module 2 and a circuit board 7, and so on can be accommodated. The switch module 2 is disposed in the main body 1 and electrically connected to the circuit board 7. The main body 1 is further equipped with elements such as optical reading module and scroll wheel which are used to function as a common computer mouse. These elements are not the technical features to be stressed, and they are not described hereinafter. The main body 1 can be one-piece or multi-piece structure, but is not limited thereto. The main body 1 has a bottom housing 11 and an upper housing 12. The bottom housing 11 and the upper housing 12 are respectively disposed at a lower part and an upper part of the main body 1, that is, the upper housing 12 is disposed on the bottom housing 11. The bottom housing 11 and the upper housing 12 can be formed integrally to be one piece, or combined to each other by screwing or through engagement.

The button 3 is arranged on the main body 1 and can be downward pressed. In other words, the button 3 can be disposed at a front portion of the upper housing 12 of the main body 1. The button 3 has a triggering portion 31 formed on an inner side thereof. The triggering portion 31 is disposed on the switch module 2. When the button 3 is pressed, the triggering portion 31 touches the switch module 2. The button 3 and the switch module 2 usually are disposed in pairs and respectively at the left and right sides of the main body 1. However, the numbers of the button 3 and the switch module 2 are not limited thereto.

The palm rest cover 4 is disposed on the upper housing 12 of main body 1 in a left-and-right swingable manner. In other words, the palm rest cover 4 can be arranged on the upper housing 12 of the main body 1 and swung to left or to right when being used. Specifically, a guiding mechanism 8 is provided between the palm rest cover 4 and the upper housing 12, so that the guiding mechanism 8 can be used to guide the palm rest cover 4 on the upper housing 12 of the main body 1 to be swung to left or to right when being used.

In an embodiment, the guiding mechanism 8 includes a guiding rail 81 and a guiding slot 82, and the numbers of the guiding rail 81 and the guiding slot 82 can be one, two or more and are not limited thereto. In the embodiment, two guiding rails 81 and two guiding slots 82 corresponding to each other are provided. The guiding rail 81 can be formed on a bottom surface of the palm rest cover 4. The guiding slot 82 can be formed on a top of the upper housing 12 of the main body 1. The guiding slot 82 can be a groove extending along a traverse direction (left and right) of the upper housing 12 of the main body 1. A length of the guiding slot 82 is larger than a length of the guiding rail 81. The guiding rail 81 is slidably disposed in the guiding slot 82, so that the palm rest cover 4 can be moved to left or to right on the upper housing 12 of the main body 1 in a swingable manner. In this embodiment, the guiding rail 81 further has a sliding rod 83, and the sliding rod 83 is movably disposed in the guiding slot 82, so that the palm rest cover 4 can be swung to left or to right more smoothly. The guiding slot 82 preferably is a T-shaped groove in a cross-sectional view. The sliding rod 83 can pass through an entrance 821, which is formed on the guiding slot 82, to enter a wider part of the guiding slot 82. In this embodiment, the guiding mechanism 8 has two sliding rods 83 respectively disposed at two ends thereof. Two entrances 821 are formed on the guiding slot 82 corresponding to the two sliding rods 83.

The positions where the guiding rail 81 and the guiding slot 82 are disposed are not limited. For example, the guiding rail 81 can be formed on a top surface of the upper housing 12 of the main body 1, and the guiding slot 82 can be formed on a bottom surface of the palm rest cover 4. In addition, the guiding rail 81 and the guiding slot 82 can be replaced by a conventional guiding rail, a sliding rail, a sliding rod, a roller, a pulley, or a guiding slot . . . etc., but the present disclosure is not limited thereto.

The numbers of the magnetic sensor 5 and the magnetic element 6 can be one, two or more, but the present disclosure is not limited thereto. In the embodiment, two magnetic sensors 5 and two magnetic elements 6, which are alternately spaced at intervals, are provided. The magnetic sensor 5 can be a Hall effect sensor . . . etc. The magnetic sensor 5 is electrically coupled with the circuit board 7 by using wires or other ways. The magnetic sensor 5 can be disposed on the upper housing 12 of the main body 1 or the palm rest cover 4. In other words, one of the upper housing 12 of the main body 1 and the palm rest cover 4 is provided with the magnetic sensor 5. In this embodiment, the magnetic sensor 5 is disposed on the upper housing 12 of the main body 1, for example, on a top surface of the upper housing 12 of the main body 1. The magnetic sensor 5 can be mounted on the upper housing 12 of the main body 1 or the palm rest cover 4, or by a base, or by other connecting elements. In this embodiment, the upper housing 12 of the main body 1 is an immovable element and the magnetic sensor 5 is mounted thereon, so that the magnetic sensor 5 is an immovable element.

The magnetic element 6 can be a magnet . . . etc., and can be mounted on the palm rest cover 4 or the upper housing 12 of the main body 1. In other words, the other of the upper housing 12 of the main body 1 and the palm rest cover 4 is provided with the magnetic element 6. In this embodiment, the magnetic element 6 is mounted on the palm rest cover 4, for example, it can be disposed on a bottom surface of the palm rest cover 4. The magnetic element 6 can be mounted on the palm rest cover 4 or the upper housing 12 and the main body 1, or by a base, or by other connecting elements. According to this embodiment, the palm rest cover 4 is swingable on the magnetic element 6, so that the magnetic element 6 is a movable element.

The magnetic element 6 and the magnetic sensor 5 are arranged separately. In this element, as the magnetic element 6 is swingable with the palm rest cover 4 on the main body 1, a relative position at the magnetic sensor 5 or the magnetic element 6 can be sensed, so that the magnetic sensor 5 can be used to sense a position change so as to output an analog signal.

The palm rest cover 4 of the present disclosure can be swung to left or to right on the upper housing 12 of the main body 1. The upper housing 12 of the main body 1 and the palm rest cover 4 are provided with the magnetic sensor 5 and the magnetic element 6, respectively. Thus, a pressure sensing signal can be produced, when the palm rest cover 4 is moved to left or to right by a user's wrist. In addition, a user can press the switches simultaneously to continue the operating movement.

Figure 5:
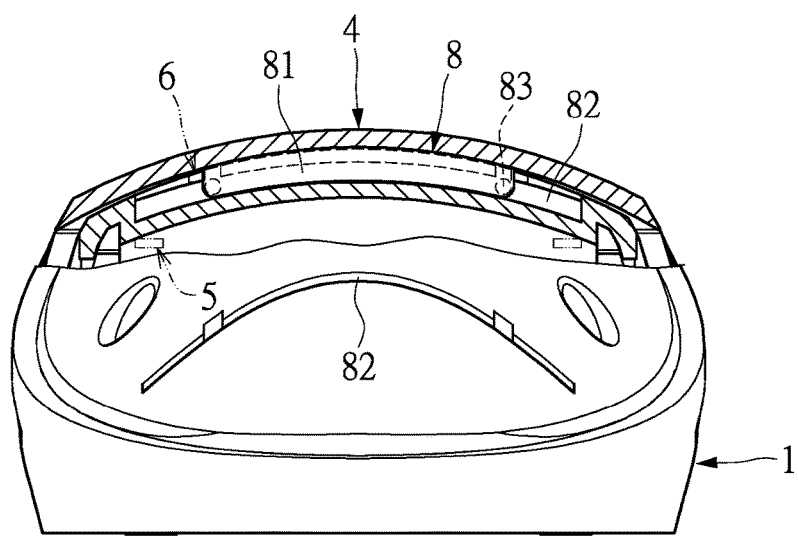
FIG. 5 is a partial cross-sectional back view of the computer mouse in a first usage condition of the present disclosure.
Figure 6:
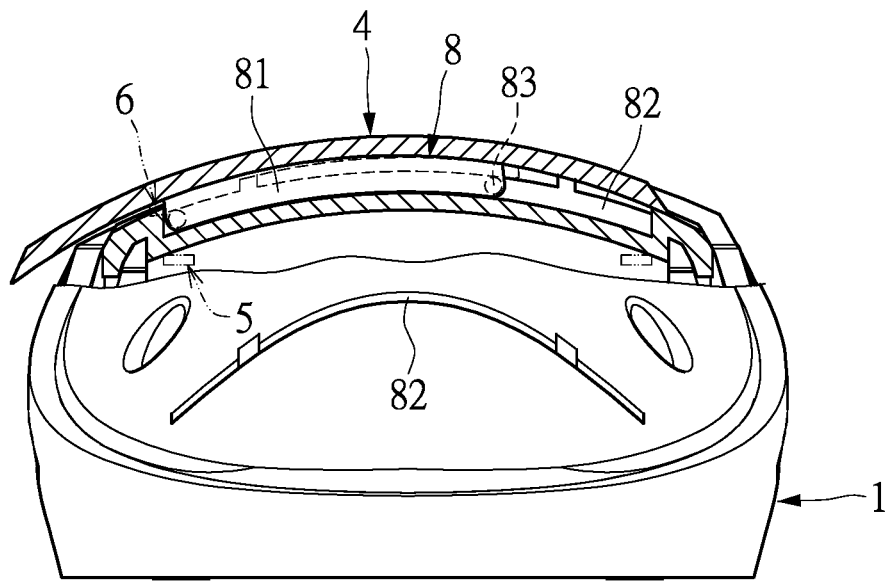
FIG. 6 is a partial cross-sectional back view of the computer mouse in a second usage condition of the present disclosure.
Figure 7:
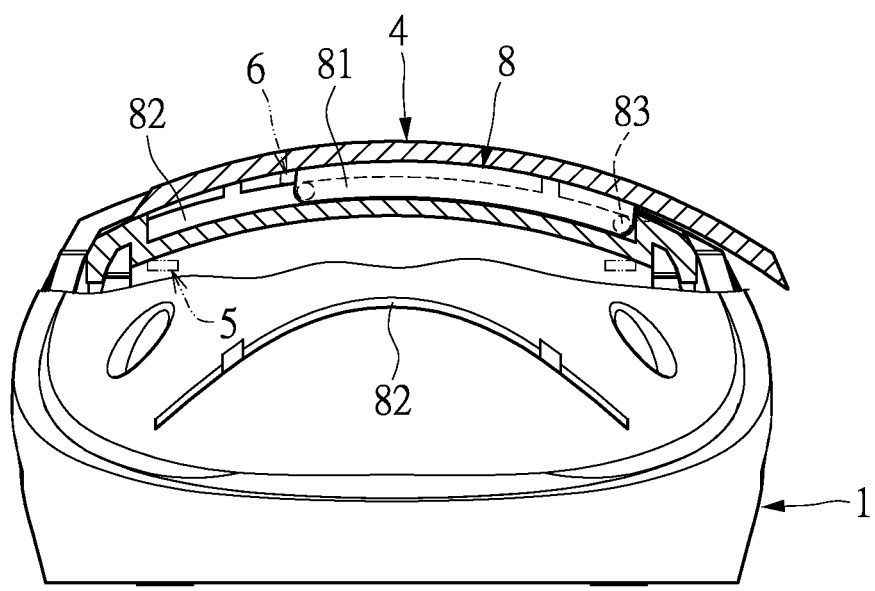
FIG. 7 is a partial cross-sectional back view of the computer mouse in a third usage condition of the present disclosure.

As shown in FIG. 5 to FIG. 7, when a user moves his/her wrist to swing the palm rest cover 4 to left or to right, the magnetic sensor 5 and the magnetic element 6 under the palm rest cover 4 begin to work and to produce a pressure sensing signal so as to output an analog signal which can be used to control a pressing force. In the present disclosure, only the palm rest cover 4 is movable and the main body 1 is stationarily placed on a desktop, so that the precision and accuracy of the mouse can be greatly increased.

According to the present disclosure, the magnetic sensor 5 and the magnetic element 6 can be functioned as L2/R2 keys of a gamepad with a long stroke and can sense pressure in a stepless manner through magnetic induction. Therefore, when a user swings the palm rest cover 4, a pressing force can be controlled according to a swinging force so as to provide a stepless pressure sense.

In the present disclosure, the computer mouse can provide a function of pressure sensing to enable game players to have following fine distinct actions. 1. A force of serving a ball and hitting a ball can be determined by measuring the strength of user's finger when a mouse button is being pressed. 2. Controlling accelerator and brake in games can be determined more precisely by sensing a pressing force. 3. A steering wheel used in games can be controlled more flexibly in addition to turning to the uttermost left or the uttermost right. 4. A throttle valve and a flap wing in flying games can be controlled more precisely. 5. The strength of attacking force can be determined by sensing a pressing force in the MMORPG game.

Second Embodiment

Figure 8:
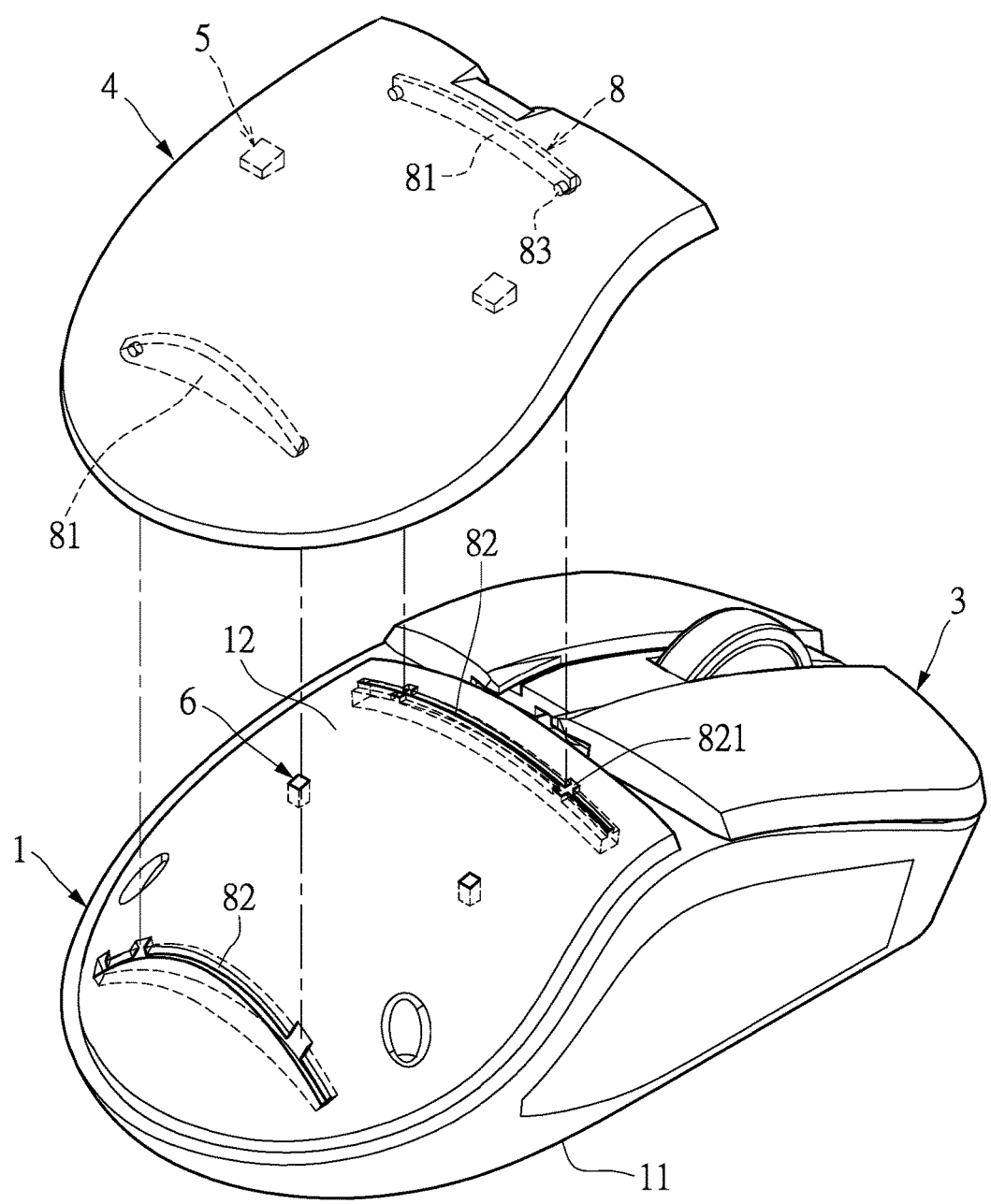
FIG. 8 is an exploded perspective view of the computer mouse of the present disclosure.

Refer to FIG. 8. In this embodiment, the magnetic sensor 5 can be a Hall effect sensor . . . etc. The magnetic sensor 5 is disposed on the palm rest cover 4, such as a bottom surface of the palm rest cover 4. Since the magnetic sensor 5 is swingably disposed on the palm rest cover 4, the magnetic sensor 5 is a movable element. The magnetic sensor 5 can be electrically connected to the circuit board 7 by using wires . . . etc. In this embodiment, the magnetic element 6 can be a magnet . . . etc. The magnetic element 6 is disposed on the upper housing 12 of the main body 1, for example, on a top surface of the upper housing 12 of the main body 1. The upper housing 12 is fixed on the main body 1, so the magnetic element 6 is an immovable element.

In this embodiment, when a user moves his/her wrist to swing the palm rest cover 4 to left or to right, the magnetic sensor 5 under the palm rest cover 4 and the magnetic element 6 begin to function, and to produce a pressure sensing signal to output an analog signal which can control a pressing force.

The descriptions illustrated supra set forth simply the preferred embodiments of the present disclosure; however, the characteristics of the present disclosure are by no means restricted thereto. All changes, alterations or modifications conveniently considered by those skilled in the art are deemed to be encompassed within the scope of the present disclosure delineated by the following claims.

What is claimed is:

1. A computer mouse with swingable palm rest cover, comprising:
    a main body, having a bottom housing and an upper housing, wherein the upper housing is disposed on the bottom housing;
    a switch module, disposed in the main body, wherein the switch module is electrically connected to a circuit board;
    a button, movably disposed on the main body and having a triggering portion formed on an inner side thereof, wherein the triggering portion is disposed on the switch module;
    a palm rest cover, disposed on the upper housing of the main body in a left-and-right swingable manner;
    a guiding mechanism arranged between the palm rest cover and the upper housing of the main body, to guide the palm rest cover to swing on the upper housing of the main body;
    a magnetic sensor, disposed on one of the upper housing of the main body and the palm rest cover, and the magnetic sensor electrically connected to the circuit board; and
    a magnetic element, disposed on the other of the upper housing of the main body and the palm rest cover;
    wherein the guiding mechanism includes a guiding rail and a guiding slot, the guiding rail is disposed on a bottom surface of the palm rest cover or a top surface of the upper housing of the main body, the guiding slot is formed on the top surface of the upper housing of the main body or the bottom surface of the palm rest cover, the guiding rail is slidably disposed in the guiding slot, the guiding rail is disposed with a sliding rod, and the sliding rod is slidably disposed in the guiding slot; and
    wherein when the palm rest cover is swung to left or to right, the magnetic sensor and the magnetic element are capable of sensing a position change of the palm rest cover, so as to output an analog signal.

2. The computer mouse with swingable palm rest cover as claimed in claim 1, wherein the magnetic sensor is a Hall effect sensor, the magnetic element is a magnet, and the magnetic element and the magnetic sensor are alternately spaced at intervals.

3. The computer mouse with swingable palm rest cover as claimed in claim 1, wherein the magnetic sensor is disposed on the top surface of the upper housing of the main body, the magnetic element is disposed on the bottom surface of the palm rest cover.

4. The computer mouse with swingable palm rest cover as claimed in claim 1, wherein the magnetic sensor is disposed on the bottom surface of the palm rest cover, the magnetic element is disposed on the top surface of the upper housing of the main body.

* * * * *